United States Patent
Brunner

(10) Patent No.: US 10,800,076 B2
(45) Date of Patent: Oct. 13, 2020

(54) METHOD FOR PRODUCING A MULTI-SECTION PLASTIC COMPONENT, AND A MULTI-SECTION PLASTIC COMPONENT

(71) Applicant: Bayerische Motoren Werke Aktiengesellschaft, Munich (DE)

(72) Inventor: Johann Brunner, Neumarkt St. Veit (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 15/686,682

(22) Filed: Aug. 25, 2017

(65) Prior Publication Data

US 2017/0348882 A1 Dec. 7, 2017

Related U.S. Application Data

(63) Continuation of application No. PCT/EP2016/057343, filed on Apr. 4, 2016.

(30) Foreign Application Priority Data

Apr. 22, 2015 (DE) .......................... 10 2015 207 262

(51) Int. Cl.
*B29C 45/00* (2006.01)
*B29C 45/16* (2006.01)
(Continued)

(52) U.S. Cl.
CPC ...... *B29C 45/0062* (2013.01); *B29C 45/1628* (2013.01); *B29C 45/32* (2013.01);
(Continued)

(58) Field of Classification Search
CPC . B29C 45/0062; B29C 45/1628; B29C 45/32; B29C 2045/0079; B29K 2101/12;
(Continued)

(56) References Cited

U.S. PATENT DOCUMENTS

2002/0109263 A1   8/2002   Goldbach
2004/0211668 A1 * 10/2004   Montminy ............ B01D 61/48
                                                    204/533

(Continued)

FOREIGN PATENT DOCUMENTS

CN   1491157 A     4/2004
CN   101341198 A   1/2009
(Continued)

OTHER PUBLICATIONS

English translation of Chinese-language Office Action issued in counterpart Chinese Application No. 201680004478.9 dated Sep. 26, 2018 (10 pages).

(Continued)

*Primary Examiner* — Joseph S Del Sole
*Assistant Examiner* — Mohamed K Ahmed Ali
(74) *Attorney, Agent, or Firm* — Crowell & Moring LLP

(57) ABSTRACT

A method is provided for producing a multi-section plastic component in which a first plastic injection-molded individual part and a second plastic injection-molded individual part are formed. The plastic injection-molded individual parts are joined by injecting a plastic moulding compound. The plastic molding compound is a non-elastomeric thermoplastic and forms a plastic connecting component following a curing process. The plastic injection-molded individual parts and plastic connecting component are then at least partially painted.

9 Claims, 2 Drawing Sheets

(51) Int. Cl.
*B29C 45/32* (2006.01)
*B29K 101/12* (2006.01)
*B29K 105/00* (2006.01)
*B29L 31/30* (2006.01)

(52) U.S. Cl.
CPC .. *B29C 2045/0079* (2013.01); *B29K 2101/12* (2013.01); *B29K 2105/0085* (2013.01); *B29K 2105/0094* (2013.01); *B29K 2995/007* (2013.01); *B29L 2031/3041* (2013.01)

(58) Field of Classification Search
CPC .... B29K 2105/0085; B29K 2105/0094; B29K 2995/007; B29L 2031/3041
See application file for complete search history.

(56) References Cited

U.S. PATENT DOCUMENTS

| | | |
|---|---|---|
| 2007/0100060 A1 | 5/2007 | Tahri et al. |
| 2008/0138561 A1 | 6/2008 | Umezawa |
| 2010/0187723 A1 | 6/2010 | Miyazawa et al. |
| 2012/0228253 A1* | 9/2012 | Haimoff ............ B29C 45/0062 211/153 |
| 2015/0165661 A1 | 6/2015 | Okumura et al. |

FOREIGN PATENT DOCUMENTS

| | | | |
|---|---|---|---|
| CN | 103358462 A | 10/2013 | |
| DE | 11 2006 000 572 T5 | 1/2008 | |
| DE | 10 2007 014 847 A1 | 10/2008 | |
| DE | 10 2010 005 901 A1 | 10/2010 | |
| DE | 10 2010 019 625 A1 | 12/2010 | |
| DE | 10 2011 017 040 A1 | 10/2012 | |
| DE | 102011017040 A1 * | 10/2012 | ......... B29C 45/0053 |
| EP | 1 974 886 A1 | 10/2008 | |
| JP | 4-201424 A | 7/1992 | |
| JP | 11-170296 A | 6/1999 | |
| TW | 201309465 A | 3/2013 | |

OTHER PUBLICATIONS

German Search Report issued in counterpart German Application No. 10 2015 207 262.2 dated Oct. 13, 2015 with partial English-language translation (Eleven (11) pages).

International Search Report (PCT/ISA/210) issued in PCT Application No. PCT/EP2016/057343 dated Jun. 17, 2016 with English-language translation (five (5) pages).

German-language Written Opinion (PCT/ISA/237) issued in PCT Application No. PCT/EP2016/057343 dated Jun. 17, 2016 (five (5) pages).

* cited by examiner

METHOD FOR PRODUCING A MULTI-SECTION PLASTIC COMPONENT, AND A MULTI-SECTION PLASTIC COMPONENT

CROSS REFERENCE TO RELATED APPLICATIONS

This application is a continuation of PCT International Application No. PCT/EP2016/057343, filed Apr. 4, 2016, which claims priority under 35 U.S.C. § 119 from German Patent Application No. 10 2015 207 262.2, filed Apr. 22, 2015, the entire disclosures of which are herein expressly incorporated by reference.

BACKGROUND AND SUMMARY OF THE INVENTION

A process for producing a multi-part plastics component is specified. The multi-part plastics component may be, for example, a vehicle outer skin part of, for example, a vehicle trunk lid, a vehicle rear spoiler or a vehicle rear trim panel.

Published application DE 10 2007 014 847 A1 describes a multi-part plastics component produced using an injection molding apparatus. In the production process two individual injection molded plastics parts are joined to one another using an adhesive made of a thermoplastic elastomer (TPE). Thermoplastic elastomers are notable for example for their easy processability (very high flowability).

The disadvantage of the plastics component described in the prior art is that the adhesive formed from the thermoplastic elastomer can be painted only with great difficulty, if at all, since TPE has an extremely low modulus of elasticity. For plastics components, in particular in vehicle outer skin parts, where the adhesive/both individual injection molded plastics parts are externally visible, this gives rise to disadvantages in terms of external appearance.

Proceeding from the prior art it is accordingly an object of at least some embodiments to specify a process for producing a multi-part plastics component by which a multi-part plastics component, which includes at least a first and a second individual injection molded plastics part and exhibits good paintability, may be produced. It is a further object to specify a multi-part plastics component produced with the process.

These objects are achieved by a process and an article according to embodiments of the invention.

In one embodiment, in a process for producing a multi-part plastics component, a first individual injection molded plastics part and a second individual injection molded plastics part are formed. The individual injection molded plastics parts are individual parts produced using an injection molding process. The individual injection molded plastics parts are preferably formed from a thermoplastic material. By way of example, the individual injection molded plastic parts comprise polypropylene, polyamide and/or polybutylene terephthalate or consist of polypropylene, polyamide or polybutylene terephthalate.

The individual injection molded plastics parts are furthermore joined by injection of a plastics molding material. The plastics molding material is a nonelastomeric thermoplastic. The nonelastomeric thermoplastic is preferably a thermoplastic in the classical sense. In particular, the nonelastomeric thermoplastic may be a thermoplastic without an elastomer fraction. By contrast, the nonelastomeric thermoplastic is not a thermoplastic elastomer. After a hardening operation, the plastics molding material formed from the nonelastomeric thermoplastic forms a plastics joining part.

Furthermore, both the individual injection molded plastics parts and the plastics joining part are at least partially painted in a further process step. The use of a non-elastomeric thermoplastic for joining the individual injection molded plastics parts advantageously achieves a good paintability and a high stiffness of the multi-part plastics component.

In a further embodiment, the non-elastic thermoplastic has a melt flow index MFR wherein the melt flow index MFR is not less than 70 g/10 min. In a particularly preferred embodiment, the non-elastic thermoplastic has a melt flow index of not less than 100 g/10 min. The reported melt flow indices are to be understood as meaning the melt flow indices obtained under test conditions typical for the respective materials, for example at a test temperature of 190° C. or 230° C. and a test load of, for example, 2.16 kg or 5 kg.

In a further embodiment, the thermoplastic comprises a polyolefin or consists of a polyolefin. By way of example the nonelastic thermoplastic may comprise polypropylene, polyethylene and/or polyisobutylene terephthalate or consist of polypropylene, polyethylene or polyisobutylene.

In a further embodiment, the nonelastic thermoplastic comprises statistical copolymers, for example so-called random copolymers or consists thereof.

In a further embodiment, the plastics joining component has a Shore D hardness of not less than 50. In a preferred embodiment, the plastics joining component has a shore D hardness of at least 60. In a particularly preferred embodiment the plastics joining component has a Shore D hardness of at least 70.

In a further embodiment the multi-part plastics component is formed using an apparatus for injection molding. The apparatus has at least two outer mold elements and at least two inner mold elements arranged between the outer mold elements. The outer mold elements preferably each form a cavity with the respective adjacent inner mold element into which, using one or more injection assemblies for manufacturing the individual injection molded plastics parts, a plastics molding material is introduced. In the process, the two inner mold elements are preferably rotated and/or moved.

In a further embodiment, the apparatus for injection molding has at least one joining assembly for joining the individual injection molded plastics parts. In the process the individual injection molded plastic parts are preferably formed by injection of a plastics molding material.

Also specified is a multi-part plastics component comprising at least two individual injection molded plastics parts joined by way of a plastics joining component formed from the nonelastomeric thermoplastic. The multi-part plastics component may have one or more of the features cited in connection with the process for producing the multi-part plastics component. The multi-part plastics component may, in particular, be produced with the above described process.

In a further embodiment, the multi-part plastics component is a double-shelled vehicle outer skin part. By way of example, the first individual injection molded plastics part may be an outer shell component of the vehicle outer skin part and the second individual injection molded plastics part may be an inner shell component of the vehicle outer skin part. The outer shell component is preferably completely painted and the inner shell component is preferably at least partially painted. Furthermore, the plastics joining component which joins the two individual injection molded plastics parts is preferably at least partially painted.

In a further embodiment, the double-shelled vehicle outer skin part is a vehicle trunk lid, a vehicle rear spoiler or a vehicle rear trim panel. The vehicle outer skin part may, in particular, be an active rear spoiler, i.e. a retractable rear spoiler.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
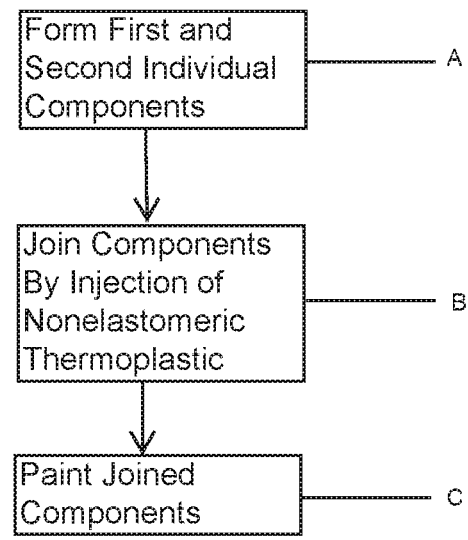
FIG. 1 is a flow chart of a process for producing a multi-part plastics component according to one embodiment.

In the embodiments and figures identical or identically acting features may each be provided with the same reference numerals. The depicted elements and their relative sizes should generally not be regarded as shown to scale. On the contrary, individual elements may be shown with excessive thicknesses or excessively large dimensions for ease of depiction and/or understanding.

FIG. 1 shows a schematic depiction of a process for producing a multi-part plastics component according to one embodiment. In a process step A, a first individual injection molded plastics component 10 and a second individual injection molded plastic part 20 are formed. An injection molding apparatus 100, as described in connection with FIG. 2, may be employed for example. The individual injection molded plastics parts 10, 20 are preferably formed from a thermoplastic, for example from polypropylene, polyamide or polybutylene terephthalate. In process step B, which may for example immediately follow process step A, the individual injection molded plastics parts are joined to one another by injection of a plastics molding material which is a nonelastomeric thermoplastic. The nonelastomeric thermoplastic may, for example, be a polyolefin, for example polypropylene, polyethylene or polyisobutylene. The nonelastomeric thermoplastic preferably has a melt flow index of not less than 100 g/10 min. After a hardening operation, the molding material formed from the nonelastomeric thermoplastic forms a plastics joining component 30. The plastics joining component 30 may, for example, have a Shore D hardness of at least 60. In a further process step C, which follows process step B, both the individual injection molded plastics parts 10, 20 and the plastics joining component 30 are at least partially painted.

Figure 2:
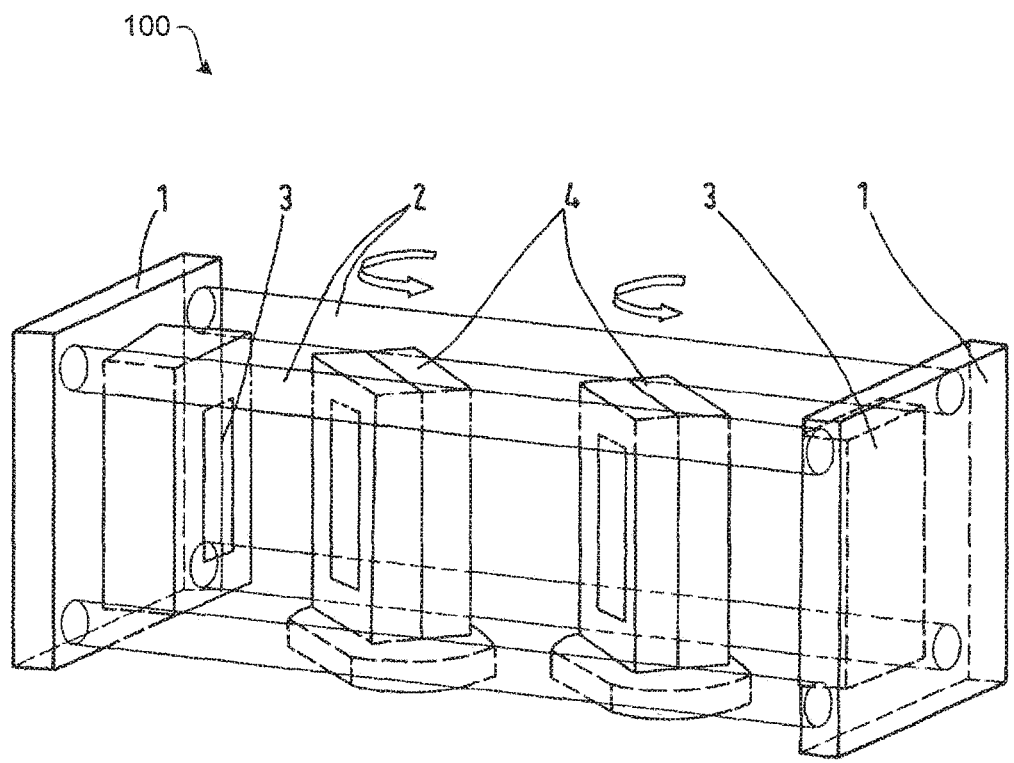
FIG. 2 is a schematic view of an apparatus for injection molding a multi-part plastics component according to a further embodiment.
Figure 3:
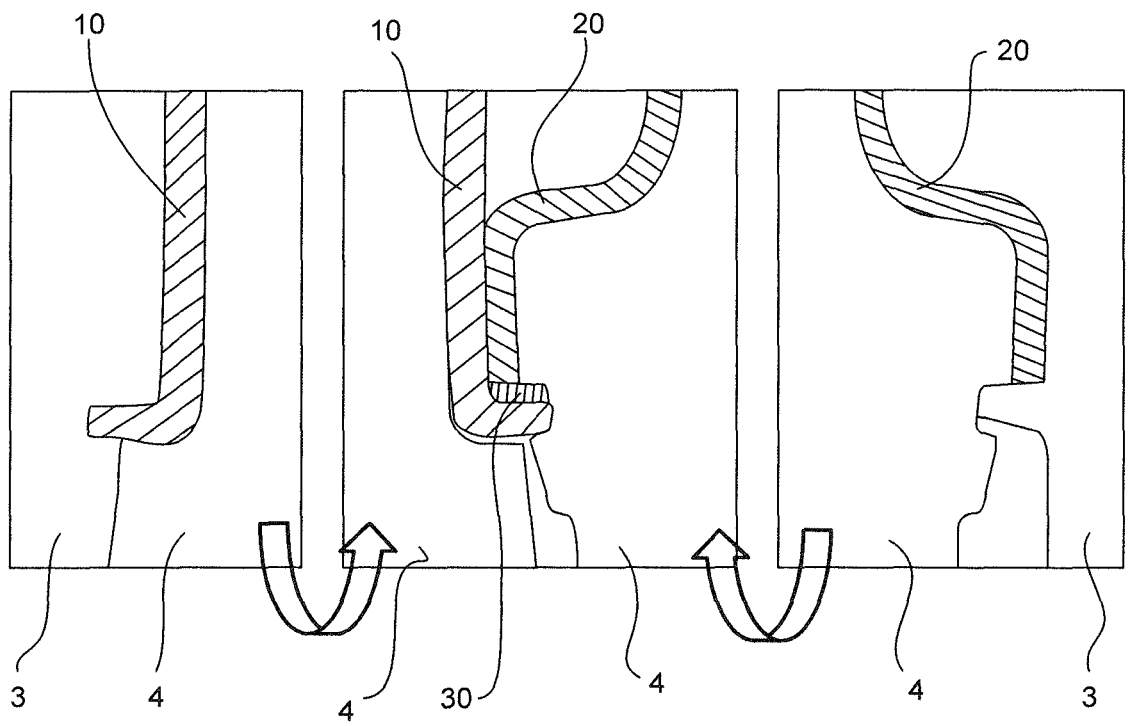
FIG. 3 is a schematic representation of the process for producing a multi-part plastics component according to a further embodiment.

The apparatus for injection molding a multi-part plastics component depicted in FIGS. 2 and 3 includes a frame made of two machine plates 1 and four beams 2 which join the machine plates. A respective outer mold element 3 is positioned contacting against each machine plate 1.

Inside the space defined by the beams 2 and between the two outer mold elements 3 are two inner, cuboidal mold elements 4, which are both rotationally and translationally movable along the direction defined by the struts via a propulsion drive (not shown). Two opposite sides of each of the cuboidal mold elements 4 are formed such that upon flat contacting against the respective adjacent outer mold element 3 they form a cavity into which, using injection assemblies (not shown), a plastics molding material may be injected to produce the individual injection molded plastics parts 10, 20. After sufficient hardening of the plastics molding material, the inner mold elements 4 are translationally moved, thus opening the mold (cavity) formed in each case by an inner and an outer mold element. The individual injection molded plastics parts 10, 20 are affixed to the respective inner mold element 4 using affixing means (not shown).

After a rotation of the two inner mold elements 4 by 180° each, these are moved together to an extent such that the two individual injection molded plastics parts 10, 20 can be joined by injection of a nonelastomeric thermoplastic into a joining seam cavity formed by the two individual injection molded parts 10/20 using a joining assembly (not shown). The nonelastomeric thermoplastic injected to join the individual injection molded plastics parts 10, 20 forms a plastics joining component 30 after a hardening operation. The use of a nonelastomeric thermoplastic for joining the individual injection molded plastics parts 10, 20 advantageously improves the paintability of the obtained plastics components and the stiffness thereof.

Simultaneously with the injection of the nonelastomeric thermoplastic, the outer mold elements 3 are moved against the free sides of the inner mold elements 4 in order that further individual injection molded plastics parts 10, 20 may be injection molded during the joining process of the previously produced individual injection molded plastics parts 10, 20.

After the joining of the first two individual injection molded plastics parts 10, 20 and the simultaneous injection molding of the second two individual injection molded plastics parts 10, 20, the outer mold elements 3 are moved outwards, thus causing the individual injection molded plastics parts 10, 20 to be demolded and to remain affixed to the inner mold elements 4. Simultaneously, the two inner mold elements are also moved apart in order that the joined plastics component is released from one of the inner mold elements 4 while remaining affixed to the other inner mold element 4. After a rotation of the two inner mold elements 4 by 90°, the finished plastics component is removed. This is followed by renewed rotation of the inner mold elements 4 by 90° and renewed moving together of the four mold elements 3, 4 to form a closed block so that the second two individual injection molded plastics parts 10, 20 may be joined using the nonelastomeric thermoplastic and a third pair of individual injection molded plastics parts 10, 20 may be injection molded. The described cycle may be repeated at a high cycle rate to produce a multiplicity of multi-part plastics components.

The obtained plastics components may be, for example, double-shelled vehicle outer skin parts and, in particular, the plastics components may be vehicle trunk lids, vehicle rear spoilers or vehicle rear trim panels.

The features described in the working examples shown may also be combined with one another according to working examples. Alternatively or in addition, the working examples shown in the figures may comprise further features according to the embodiments of the general description.

REFERENCE NUMERALS

1 Machine plate
2 Beam

3 Outer mold element
4 Inner mold element
10 First individual injection molded plastics part
20 Second individual injection molded plastics part
30 Plastics joining component
100 Apparatus for injection molding
A, B, C Process steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a multi-part plastics component, the process comprising the acts of:
   forming a first individual injection molded plastics part and a second individual injection molded plastics part in respective mold elements at opposing ends of an injection molding apparatus;
   rotating and translating at least portions of the respective mold elements between the opposing ends of the injection molding apparatus such that the first and second individual injection molded plastics parts are adjacent to one another;
   joining the first and second individual injection molded plastics parts by injection of a plastics molding material, wherein the plastics molding material is a nonelastomeric thermoplastic which, after a hardening operation, forms a plastics joining component;
   at least partially painting the first and second individual injection molded plastics parts and the plastics joining component, wherein the nonelastomeric thermoplastic has a melt flow index MFR, wherein MFR >70 g/10 min.

2. The process as claimed in claim 1, wherein the nonelastomeric thermoplastic comprises a polyolefin or consists of a polyolefin.

3. The process as claimed in claim 2, wherein the nonelastomeric thermoplastic comprises polypropylene, polyethylene and/or polyisobutylene or consist of polypropylene, polyethylene or polyisobutylene.

4. The process as claimed in claim 1, wherein the nonelastomeric thermoplastic comprises statistical copolymers.

5. The process as claimed in claim 1, wherein the nonelastomeric thermoplastic comprises random copolymers.

6. The process as claimed in claim 1, wherein the plastics joining component has a Shore D hardness of not less than 60.

7. The process as claimed in claim 1, wherein the plastics joining component has a Shore D hardness of not less than 60.

8. The process as claimed in claim 1, wherein
   the respective mold elements include at least two outer mold elements and at least two inner mold elements arranged between the outer mold elements,
   wherein the outer mold elements each form a cavity with the respective adjacent inner mold element into which, using one or more injection assemblies for manufacturing the individual injection molded plastics parts, a plastics molding material is introduced.

9. The process as claimed in claim 8, wherein the apparatus comprises at least one joining assembly for joining the individual injection molded plastics parts by injection of a plastics molding material.

\* \* \* \* \*